May 12, 1970  F. J. SANTANGELO  3,511,902
METHOD OF MOLDING COMPOSITE CONTAINERS
Filed Dec. 6, 1966  3 Sheets-Sheet 1
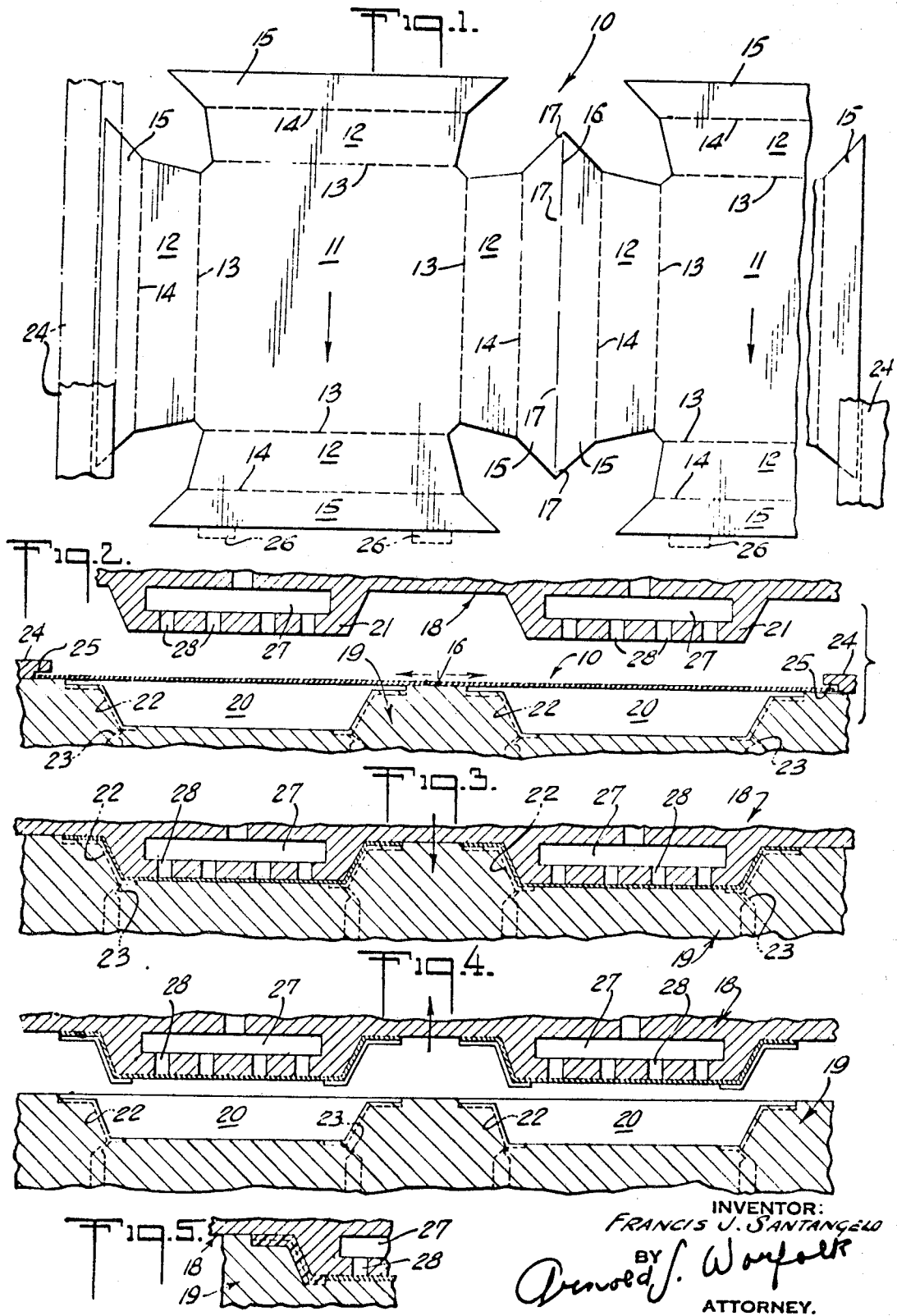
INVENTOR:
FRANCIS J. SANTANGELO
BY Arnold J. Worfolk
ATTORNEY.

May 12, 1970
F. J. SANTANGELO
3,511,902
METHOD OF MOLDING COMPOSITE CONTAINERS
Filed Dec. 6, 1966
3 Sheets-Sheet 2
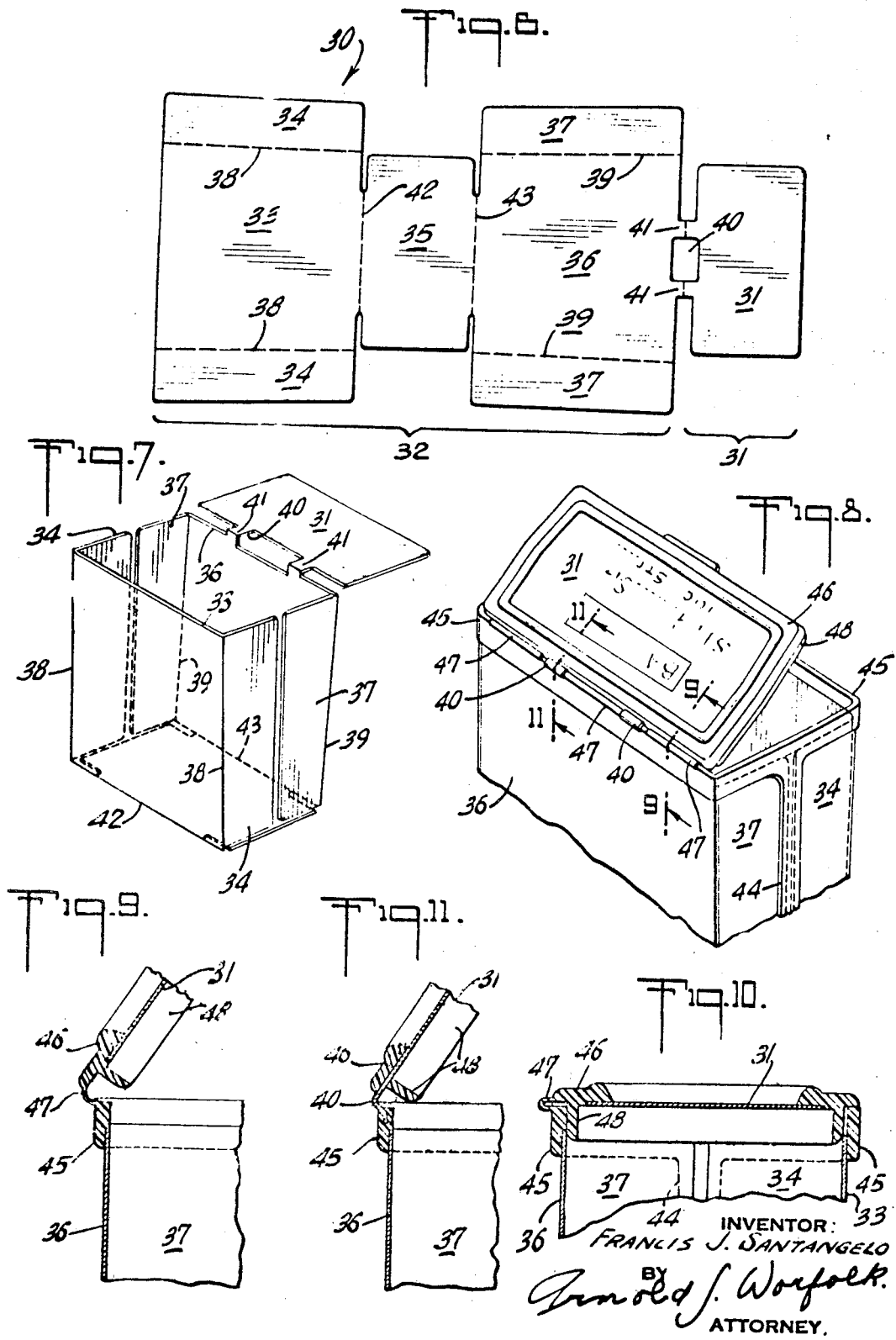
INVENTOR:
FRANCIS J. SANTANGELO
BY
Arnold J. Worfolk.
ATTORNEY.

May 12, 1970   F. J. SANTANGELO   3,511,902
METHOD OF MOLDING COMPOSITE CONTAINERS
Filed Dec. 6, 1966                                3 Sheets-Sheet 3
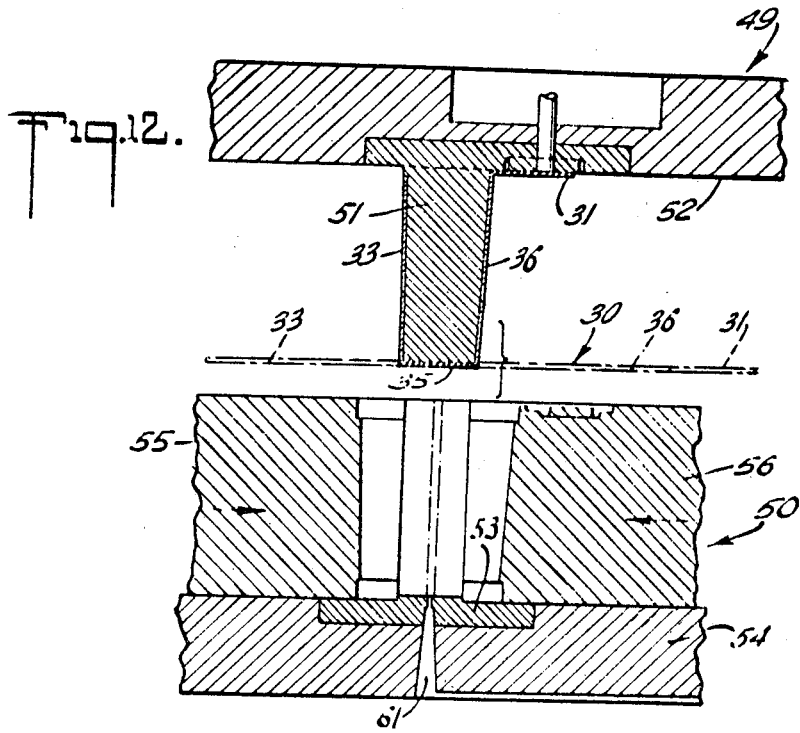
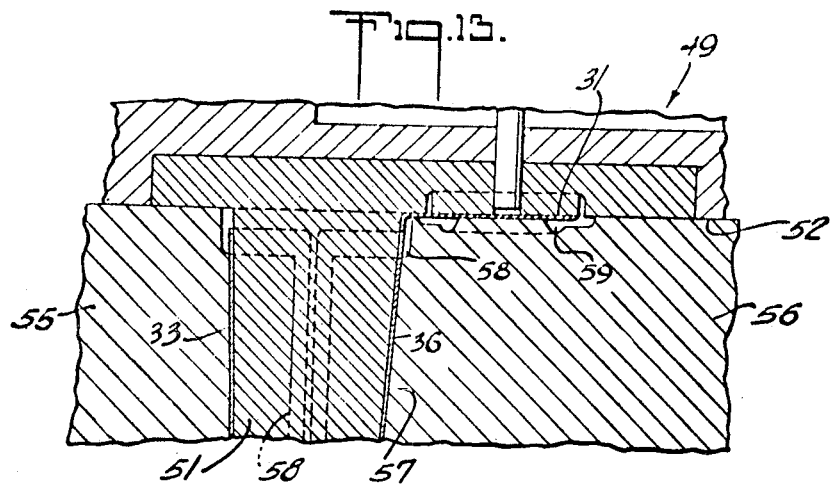
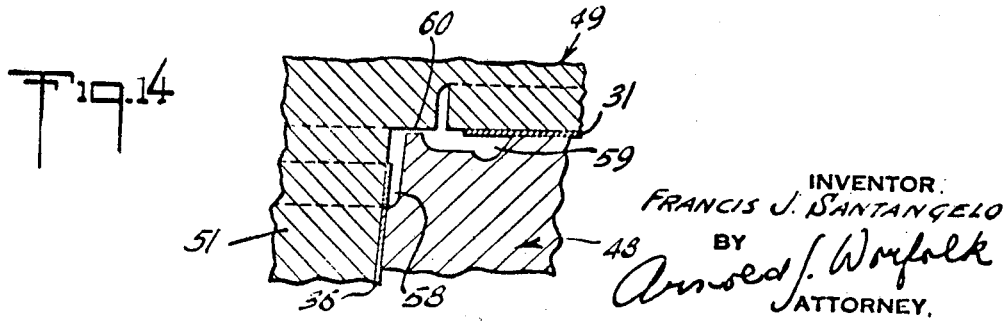
INVENTOR.
FRANCIS J. SANTANGELO
BY
Arnold J. Woifolk
ATTORNEY.

United States Patent Office 3,511,902
Patented May 12, 1970

3,511,902
METHOD OF MOLDING COMPOSITE CONTAINERS
Francis J. Santangelo, Middlesex, N.J., assignor to Johnson & Johnson, a corporation of New Jersey
Filed Dec. 6, 1966, Ser. No. 599,472
Int. Cl. B29b 3/00; B29g 3/00
U.S. Cl. 264—163
2 Claims

ABSTRACT OF THE DISCLOSURE

A plurality of composite container elements of plastic and flexible sheet material of the general type disclosed in U.S. Pat. 3,119,540 are molded in a single molding cycle by providing a corresponding plurality of sections in the mold and a unitary blank of flexible sheet material containing unsevered portions holding together the respective portions of the blank for the plurality of container elements, and utilizing cooperation between the unsevered portions of the blank and the closing action of the mold to associate the respective portions of the blank properly with respect to their corresponding mold sections.

SUMMARY OF THE INVENTION

In accordance with the present improvements, paneling of flexible sheet material for a plurality of container elements are formed from a unitary blank with an unsevered portion connecting different sections of the paneling material approriated for the different container elements. The mold is equipped with members movable to closed and open positions and which have a plurality of sections corresponding to the number of container elements to be molded in a single molding cycle. In accordance with one aspect of the present improvements, as the mold members move to closing position, such movement in cooperation with the unsevered connecting portions of the blank acts to register the portions of the blank appropriated for the different container elements with the appropriate container sections of the mold. Continued movement to close the mold severs the unitary blank into sections along the previously unsevered portions referred to and clamps the portions of the blank thus severed in the mold sections with which they are in registry. Once the severed blank portions have been located in the different mold sections through the cooperation of their initial unitary structure and the mold movement, the molding operation proceeds in the different mold sections the same as if a single container only were involved.

In accordance with another aspect of the present improvements, the plurality of container elements in the finished product comprises a receptacle portion of a container and a hinged lid portion thereof which are relatively movable to open and close the container. The paneling of sheet material for the receptacle portion of the container and for the lid are connected together in a unitary blank by relatively small sections of the flexible sheet material which may be scored in a location anticipatory of a hinge about which the lid and the receptacle portion of the container pivot relatively when fabrication of the container is complete.

The paneling sections for the receptacle portion of the container are folded about a core portion of one mold member and as the mold closes to locate such sections in their proper positions relative to mold cavities in which their cooperating plastic sections are formed, the paneling section for the lid is also located properly with respect to mold cavities in which plastic sections are molded about the lid panel portion. In the same molding cycle, the plastic structure of the receptacle portion of the container and the plastic structure of the lid are connected by a flexible plastic hinge. The lid panel accordingly is located in proper position with respect to the receptacle portion of the container and will so continue throughout the life of the container even though the connecting sheet material between the lid and the receptacle portions of the container, because of its relative unsuitability as permanent hinge material, is destroyed or removed.

DESCRIPTION OF DRAWINGS

A better understanding of the invention may be had from the following description read in conjunction with the accompanying drawings wherein:

FIG. 1 is a plan view of a flat unitary blank from which a plurality of container elements are formed in accordance with the invention;

FIG. 2 is a fragmentary horizontal transverse sectional view through a mold for two container elements and showing a unitary blank in position prior to the mold closing phase of the molding cycle;

FIG. 3 is a view similar to FIG. 2 but showing the parts after the blank has been severed and the severed portions located in their respective mold sections;

FIG. 4 is a view similar to FIG. 2 but showing the parts after the plastic injection phase of the molding cycle and after the mold has opened to permit discharge of the container elements from their respective mold sections;

FIG. 5 is a sectional view through a corner of a container element after injection of the plastic but before the mold has opened to permit the discharge of the container element;

FIG. 6 is a plane view of a flat unitary blank from which a plurality of container elements are formed in accordance with the invention, one a lid container element and the other a receptacle container element which are relatively movable to open and close the container;

FIG. 7 is a perspective view of the blank of FIG. 6 folded to show the relative positions the panels will occupy in the mold prior to injection of the plastic material;

FIG. 8 is a fragmentary perspective view showing the upper part of a composite container with the composite hinged lid partially raised;

FIG. 9 is a fragmentary transverse sectional view on line 9—9 of FIG. 8;

FIG. 10 is a transverse sectional view similar to FIG. 9 but through the entire lid and when the lid is closed;

FIG. 11 is a fragmentary transverse sectional view on line 11—11 of FIG. 8;

FIG. 12 is a fragmentary transverse sectional view, partly diagrammatic, through a mold suitable for forming the container of FIG. 8 and prior to closing the mold;

FIG. 13 is a fragmentary, partly diagrammatic transverse sectional view of a portion of the mold shown in FIG. 12 but with the mold sections in closed position; and FIG. 14 is a view of a portion of the mold shown in FIG. 13 on an enlarged scale.

A unitary blank 10 for making a plurality of composite container elements of flexible sheet material with a reinforced injection molded plastic strengthening structure is illustrated in FIG. 1. The blank preferably is died out of a flat sheet material such as paper or the like to form two sections comprising each, in part, a bottom portion 11 and marginal side portions 12 extending outwardly from the bottom portion at each of its edges. In forming a container from each section of the blank, side portions 12 are bent along fold lines 13 where they join bottom portion 11, upwardly to form container sides, and then along fold lines 14 outwardly to form a container rim 15. As died out from the flat sheet, the two sections constitute a unitary blank in that each section has an edge along a common line 16 where the blank is severed except at spaced relatively short intervals or portions 17. The blank is sufficiently strong at the unsevered portions to permit handling as a unit for the purposes intended, but also it is sufficiently weak to allow the blank sections to be pulled apart upon the application of a reasonable pulling force exerted in the plane of the blank on each blank section thereof in a direction away from and at right angles to the line of severance 16.

The composite containers are formed by a pair of coacting mold members 18 and 19 (FIGS. 2, 3 and 4). One mold member 19 has duplicate female recesses 20, generally the shape of the container to be formed, and for cooperation with complement male portions 21 of the other mold member 18.

Each recess 20 presents a mold cavity 22 at each of its corners into which a molten plastic resin is injected after the male and the female die members are brought together with the panel material of the container inbetween. The mold cavity has the shape of the plastic structural member to be molded for connecting, reinforcing, and determining the contour of the container panels. A channel 23 communicates with each of the mold cavities and the channels are arranged for communication with injection molding apparatus of conventional design for forcing molten plastic material into the mold cavities.

In the embodiment illustrated in FIGS. 1 to 5, the face of the female mold member 19 is vertically disposed and male die member 20 moves relatively thereto in a horizontal direction to close and open the mold cavities. Blanks of flexible sheet material 10 are arranged in a hopper (not shown) above the mold for edgewise feeding one at a time downwardly for location in front of the container sections of the mold. For this purpose there is secured to mold member 19 a pair of vertically disposed guide elements 24 arranged one adjacent the remote outer edges of each of the mold recesses 20. Guide members 24 present opposed vertical grooves 25 adjacent the face of mold member 19 and located to accommodate the opposite lateral edges of blank 10 and direct it, upon release for downward movement from the hopper, to its proper position in front of the mold recesses 20. The blank is guided downwardly by the grooves until it is arrested by the engagement of its lower edge against a plurality of stops 26 fixed to the mold member 19 on the face thereof and disposed such that when the blank is arrested its rectangular bottom portions 11 will be in vertical and horizontal registry with the inner vertical faces of the corresponding mold recesses 20 as well as with the outer vertical faces of the complementary male mold portions 21.

With the blank so located, the mold member 18 moves inwardly until the faces of mold portions 21 engage the blank and then continues until the different blank sections are clamped in the respective mold recesses 20. In accordance with the invention as male portions 21 of mold member 18 engages the interposed sections 11 of blank 10 in its mold closing operation and continues its closing movement, substantial pull is exerted on each blank portion in a direction away from the line of severance 16 with the result that previously unsevered regions 17 thereof are ruptured. The blank sections are pulled apart for movement one into each of the mold recesses 20 (FIG. 3). From there on the molding cycle insofar as this embodiment of the invention is concerned is similar to that described in Pat. 3,119,540 previously alluded to and the resulting structures or containers formed are similar to those illustrated in FIG. 8 of that patent.

In brief, the vertical outerfaces of the male mold portions 21 engage the bottom panels 11 of blank 10 to push them into the mold recesses 20 until they are clamped tightly against the inner faces thereof. During this operation the container sides 12 are bent upwardly for clamping between the corresponding sloping side faces of the male and female mold members and the container rim portions 15 are folded downwardly for clamping between the die members around the upper periphery of the mold recesses 20. When the blank is clamped in the mold and the mold closed, contiguous ends of adjacent side and rim sections of the mold blank are located in close proximity and with portions thereof extending into mold cavities 22 located one at each corner of the mold recesses. The mold recesses are constructed to form, in cooperation with marginal portions of the blank which extend into them, matrices which, when filled with plastic material, will provide a strengthening structural plastic supporting member for the container at the corners thereof.

After the plastic material has set a partial vacuum may be established in chambers 27 formed in the male mold portions 21 and which have ducts 28 communicating with the face thereof in contact with the inner bottom surface of the container element. The container element thus is held in contact with the mold section 21 as it pulls out of engagement with the mold recess 20. When mold member 18 has backed away sufficiently, the suction may be relieved and if necessary some air pressure applied against the container element so as to permit its disengagement from the mold from whence it may drop under gravity once male portion 21 has been cleared.

Another embodiment of the invention contemplates molding, in a single molding cycle, container elements which are relatively movable in the sense that one element constitutes a receptacle portion of a container and the other element a container lid which is hinged thereto for movement between closed and open positons (FIGS. 6 to 14).

According to the invention, there is provided a unitary blank 30 which includes a paneling section 31 for the container lid element and a paneling portion 32 for the container receptacle element (FIG. 6). The container receptacle paneling portion comprises three paneling sections, a section 33 for the front panel of the box and which is provided with lateral marginal portions 34 constituting the front half of each side panel of the container, a paneling section 35 for the bottom of the container, and a third paneling section 36 for the rear of the container and which also is formed with lateral marginal portions 37 constituting the rear half of each side panel of the container. Score lines 38 and 39 constitute lines of demarkation between side panel portions 34 and the remainder of paneling section 33 and between side panel portions 37 and the remainder of paneling section 36 respectively The lid paneling section 31 is connected to paneling portion 32 of the blank by relatively narrow connecting strips 40 of paneling material formed preferably with score lines 41 to insure a precise location for a line of the fold which occurs during insertion of the blank in the mold.

Before describing the insertion of the blank in the mold, mention should be made for purposes of clarity of the relative locations of the various paneling sections with respect to each other after insertion is completed bu prior to injection of the molding plastic (FIG. 7). In FIG. 7, front and back panel sections 33 and 36 are shown folded up along score lines 42 and 43 which define their lines of demarkation with bottom paneling section 35. Lateral marginal panel portions 34 are shown folded back substantially at right angles to front paneling section 33 along score lines 38 and into position where their rear edges are in close spaced relation with the front edges of lateral marginal panel portions 37 which are shown folded forwardly substantially at right angles to rear paneling section 36.

The paneling section 31 for the container lid element is shown folded backwardly substantially at right angles to rear paneling section 36 along score lines 41 which extend across connectors 40 between the lid and the receptacle paneling.

In FIG. 8 there is illustrated an upper portion of a completed container whose side paneling sections are connected together by injection molded vertical structural plastic section 44 integral with a similar structural section 45 which extends around the container receptacle at the top. The plastic structural member sections are firmly bonded to adjacent paneling material during the injection molding operation The container lid element includes a relatively rigid mloded plastic structural member 46 bonded to paneling section 31 along its peripheral edges The plastic contour defining structural member 46 of the container lid element is hinged to the plastic contour defining structural member 45 of the container receptacle element by plastic hinge devices 47 which are molded integrally with such structural elements. The structural elements of the lid and receptacle have a fixed position relatively to each other in the mold and the plastic hinge devices which are molded simultaneously with such elements insures that this precise relationship continues throughout repeated opening and closing of the container. Applicant's problem was to insure that the paneling material for the lid was precisely located with respect to the container lid plastic structure. This was acocmplished by providing the connector strips between the paneling material for the lid and the paneling material for the container receptacle at the rear. After the molding operation, portions of the strips 41 are embedded in the plastic structure atop the container receptacle portion. The portion left exposed, however, if allowed to remain as part of the composite will not interfere with the action of the plastic hinge member in controlling the precise telescoping entry of flanges 48 depending from and integral with the plastic structure of the container lid within the plastic structure of the container receptacle portion when the lid is moved to closed position (FIG. 11). The portions of the paper connecting strips 40, left exposed after the injection molding operation may be punched out if desired. On the other hand, such portions may be allowed to remain if their relatively short life before rupture is of no consequence.

The manner in which the panel sections 33, 35, and 36 of the container receptacle portion and panel section 31 of the lid portion are located with respect to the mold cavities in which their associated plastic structure is cast is illustrated in FIGS. 12, 13, and 14. In these figures a portion of a mold member section 49 is diagrammatically illustrated raised above or in an open position with respect to a mold section 50. By mechanism, not shown, the integral blank 30 is located with its bottom panel 35 in contact with bottom end of a core portion 51 of mold section 49 with its front container panel 33 extending to the left and its rear container panel 36 with lid panel 31 attached extending to the right as shown in phantom lines. By mechanism, not shown, front panel 33 is folded upwardly into contact with the front face and rear panel 36 upwardly into contact with the rear face of the depending core section 51. As the rear panel 36 moves upwardly to engage the face of the core section, the right edge (FIGS. 6 and 12) of lid panel 31 which corresponds to the right outermost edge of unitary blank 30 will strike an underlying surface 52 of the mold section 49 from which core 51 depends and as upward movement of panel 36 continues, bending will occur at score lines 41 of the connecting strip elements 40 thereby to permit lid panel section 31 to lie in face to face contact with the underlying face 52 of mold member 49. When the parts are so located, a suction applied through appropriate duct work (not shown) in the core 51 will hold the blank thereon as shown in FIG. 12.

Mold member 49 descends until the bottom panel 35 of the container receptacle engages a base member 53 of mold member 50. The general construction of the mold is known to those skilled in the art and it is necessary here to mention only that a mold supporting plate 54 against which the blank is clamped by the core when the latter descends supports mold member 50 which is arranged in two parts 55 and 56 for sliding movement toward and away from each other to close and open the mold. As mold members 55 and 56 move toward each other they engage the lateral marginal portions 34 and 37 of the front and rear container paneling 33 and 36 to move them inwardly into contact with the mold core side faces thus to complete the location of the panel sections in the positions they will occupy in the completed container (FIGS. 7, 13). When mold members 55 and 56 are in their closed positions, a mold recess 57 is presented which conforms to the contour of the container to be molded and this recess, around its top and around its bottom, as well as vertically along its sides, is recessed further to present mold cavities 58 for structural plastic sections at the top and at the bottom of the container and for the intermediate vertical structural plastic sections at its sides. In this embodiment, all plastic sections of the structural framework are interconnected.

The right hand mold member 56 is formed at the top with a mold cavity 59 shaped to form the plastic structural member 46 for the container lid and with a cavity portion 60 also for the flexible hinge 47. Cavity portion 60 extends along the upper rear edge of the container receptacle element except where it is closed off by flexible strips 40 interconnecting the lid paneling and the container receptacle paneling and which are clamped between the top and bottom mold members.

After the mold has closed, the molding cycle continues to completion by forcing plastic material through a gate 61 to produce the type of container illustrated in FIG. 8. If greater detail of the molding machine and molding cycle is desired, reference may be had to Pat. 3,154,017 previously alluded to.

If polypropylene is used in molding the structural framework for the various container elements it will produce a hinge for the container lid element which not only will be esthetic in appearance but will possess a precise hinge action operative over a long period of time. The lid panel section may be located with much precision with respect to the lid mold cavity by using precision in cutting out the unitary blank so as to insure its proper location when the panels thereof are folded up about the core. As previously stated, the ease with which the present improvements permit the relative location of the lid panel with respect to the cavity for casting the lid framework more than compensates for any lack of esthetic value or appearance in the paper connector that might occur from rupture of the sheet material after a period of using the plastic hinge. And, if desired, the portions of the connectors 40 left exposed after molding could be punched out since at that time their need has disappeared.

Any appropriate injectable plastic material may be used in completing the container once the paneling material blanks have been clamped in the mold. Suitable plastics by way of example are polyethylene, polypropylene, polystyrene, polycarbomate and others. Where the container is equipped with a plastic hinge, polypropylene is preferred for reasons well known in the art.

What is claimed is:

1. The process of making composite container elements having plastic member sections for maintaining the contour of paneling of flexible sheet material of which individual container elements are made and paneling of flexible sheet material which maintains the spatial disposition of such plastic member sections, by injecting molten plastic into matrices corresponding to the plastic member sections located in a mold having members movable between open and closed positions and in which the paneling material is confined in the desired contour with contour with marginal edges thereof extending into said matrices, wherein the improvement comprises molding a plurality of composite container elements in a single molding cycle by (a) providing the mold with a plurality of mold sections corresponding to the plurality of container elements to be molded in the single molding cycle, (b) providing a container blank of flat, flexible sheet material having paneling sections for the different container elements for location in the corresponding mold sections and with an unsevered portion of such flat sheet material connecting a paneling section of one container element with a paneling section of another container element, and said unsevered portion having a line of severence impressed therein but being sufficiently strong to permit handling of said container blank as a unit for placement into said mold but sufficiently weak to permit severing of said unsevered portion upon application of a pulling force exerted in the plane of said blank on each paneling section thereof in a direction away from and at right angles to said line of severance, and (c) by the relative movement ofthe mold parts to mold closing position, changing the flat sheet material into a three dimensional configuration and severing said unsevered portion such that the paneling section of one container element and the paneling section of the other container element are located individually in their respective mold sections, whereby after the plastic material has been injected into the matrices of the mold and the container elements discharged from the mold, said plastic member sections and paneling of sheet material perform independently in the different container elements their functions of maintaining panel contour and plastic section spatial disposition.

2. The process of making composite container elements having plastic member sections for maintaining the contour of paneling of flexible sheet material of which individual container elements are made and paneling of flexible sheet material which maintains the spatial disposition of such plastic members sections, by injecting molten plastic into matrices corresponding to the plastic member sections located in a mold having members movable between open and closed positions and in which the paneling material is confined in the desired contour with marginal edges thereof extending into said matrices, wherein the improvement comprises molding in a single molding cycle a composite container having as one element thereof a receptacle portion and as another element thereof a lid portion interconnected by a hinge element operable to move said lid element to open and closed positions on said receptacle element by (a) providing the mold with two mold sections interconnected by a cavity corresponding to the receptacle, the lid and the hinge elements respectively which are to be molded in the single molding cycle, (b) providing a container blank of flat, flexible sheet material having one paneling section for the receptacle element and another paneling section for the lid element of the container for location in the corresponding mold sections, said blank including an unsevered portion of such flat sheet material connecting said paneling sections for location in said corresponding interconnecting cavity of said mold, and (c) by the relative movement of the mold parts to mold closing position, changing the flat sheet material into a three dimensional onfiguration without severing said unsevered portion such that the paneling section of the receptacle element and the paneling section of the lid element are located in their respective mold sections connected by said unsevered portion, whereby after the plastic material has been injected into the matrices of the mold and the container elements discharged from the mold, a flexible plastic hinge is formed about said unsevered portion and connecting said receptacle element and said lid element and said plastic member sections and paneling of sheet material perform independently in the receptacle element and the lid element their functions of maintaining panel contour and plastic section spatial disposition.

References Cited

UNITED STATES PATENTS 3,154,617  10/1964  Schenk _____ 264—328
1,318,700  10/1919  Skolnick _____ 264—163

ROBERT F. WHITE, Primary Examiner

R. H. SHEAR, Assistant Examiner

U.S. Cl. X.R.

18—36; 264—251, 259, 263, 297

PO-1050
(5/69)

UNITED STATES PATENT OFFICE
CERTIFICATE OF CORRECTION

Patent No. 3,511,902        Dated May 12, 1970

Inventor(s) Francis J. Santangelo

It is certified that error appears in the above-identified patent and that said Letters Patent are hereby corrected as shown below:

In column 3, line 11, the word "complement" should read -- complementary --. Column 4, line 59, the word "bu" should read -- but --. Column 5, line 8, the word -- molded -- is mispelled. Column 6, lines 70 and 71, the words "with contour" should be deleted. Column 8, line 17, the word "onfiguration" should read -- configuration --.

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents